United States Patent [19]

Ramun et al.

[11] Patent Number: 5,107,735
[45] Date of Patent: Apr. 28, 1992

[54] INSULATION STRIPPING DEVICE FOR CABLES

[76] Inventors: John Ramun; Michael D. Ramun, both of 2100 Poland Ave., Youngstown, Ohio 44502

[21] Appl. No.: 596,215

[22] Filed: Oct. 12, 1990

[51] Int. Cl.⁵ .............................................. H02G 1/12
[52] U.S. Cl. ........................................ 83/407; 83/430; 83/431; 83/924; 83/947; 83/425.2; 81/9.51
[58] Field of Search ................... 83/425.2, 430, 431, 83/436, 404, 407, 924, 947; 81/9.51

[56] References Cited

U.S. PATENT DOCUMENTS

| | | | |
|---|---|---|---|
| 1,929,921 | 10/1933 | Gaylord | 81/9.51 |
| 2,434,640 | 1/1948 | Burdwood | 83/430 |
| 2,882,188 | 4/1959 | Levin et al. | |
| 3,309,947 | 3/1967 | Denney | 81/9.51 |
| 3,462,052 | 8/1969 | Wagner | 81/9.51 |
| 3,641,852 | 2/1973 | Terada | 83/924 |
| 3,817,132 | 6/1974 | Emery et al. | 81/9.51 |
| 3,822,615 | 7/1974 | Reed | 81/9.51 |
| 4,015,497 | 4/1977 | Burgess | 83/924 |
| 4,339,967 | 7/1982 | Greenbend | 81/9.51 |
| 4,534,254 | 8/1985 | Budzich et al. | 83/924 |
| 4,947,549 | 8/1990 | Genovese et al. | 30/90.8 |

*Primary Examiner*—Hien H. Phan

[57] ABSTRACT

A device for high speed automatic wire and cable insulation stripping. The device has pairs of infeed and outfeed cutting assemblies that engage and cut the insulation at multiple points in a two stage process. The cutting devices have multiple parallel space cutting edges that initially remove a strip of insulation insuring rapid removal of the remaining material.

7 Claims, 5 Drawing Sheets

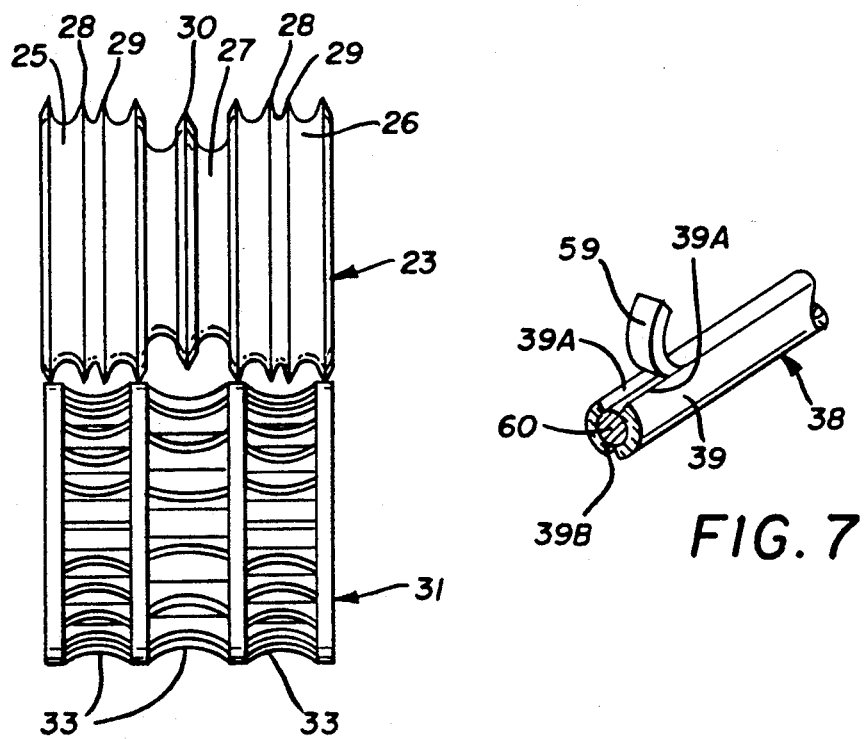
FIG. 5
FIG. 7
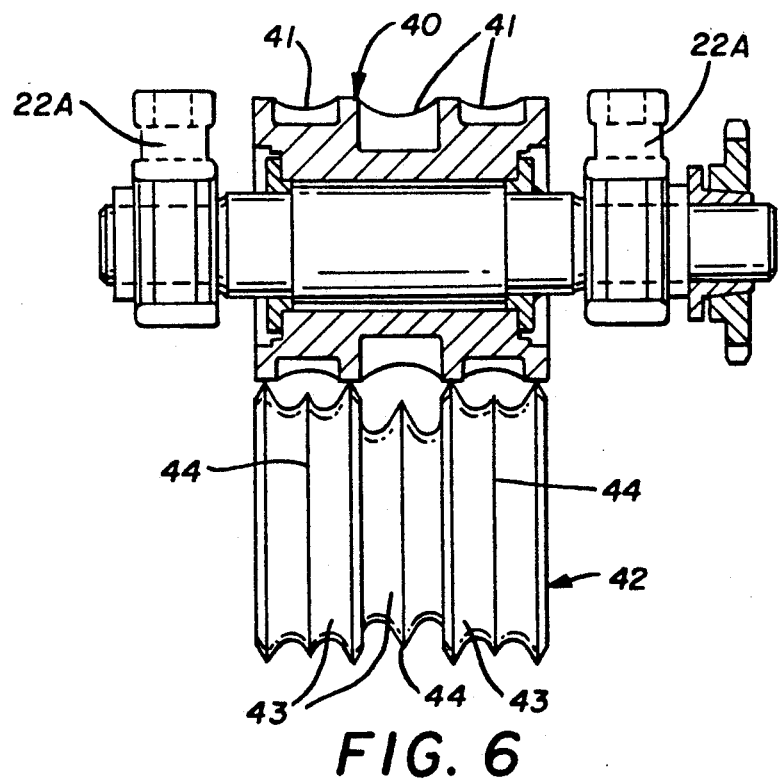
FIG. 6

5,107,735

INSULATION STRIPPING DEVICE FOR CABLES

BACKGROUND OF THE INVENTION

1. Technical Field

This device relates to wire and cable stripping apparatus to remove the outer sheath from cables and the like. These devices are required to handle various cable dimensions and to pass cable at a rapid rate continuously separating the insulation from the processed cable.

2. Description of Prior Art

Prior Art devices of this type have relied on a variety of different stripping and cutting mecnahisms to draw the cable/wire through rotating cutting rollers or fixed blade configurations-see for example U.S. Pat. Nos. 4,399,967; 3,817,132; 3,462,052; and 2,882,188.

In U.S. Pat. No. 4,399,967 a cable stripper with peeler is disclosed having feed wheels including knives that longitudinally slit the insulation sheath of the cable. A separate peeler is positioned downstream to separate the sheath from the cable.

U.S. Pat. No. 3,817,132 discloses an insulating stripping that is characterized by independent position and drive wheels and a pair of oppositely disposed cutter wheels. One cut by each wheel slits the insulation or corvering for removal.

A stripping device is shown in U.S. Pat. No. 3,462,052 having pairs of aligned cutting blade disks inclined towards one another forming a single point of cutting engagement with the outer layer of the work piece. The aligned cutting disks cut the outer layer and separate it in one continuous motion.

In U.S. Pat. No. 3,309,947 stripping device is disclosed that utilizes a signal cutting disk and a stripping cone that separates spreads, and removes the insulation at the cut downstream of the cutting disk.

U.S. Pat. No. 2,882,188 is drawn toward a method of reclaiming insulated wire by stripping the insulation and reclaiming it along with the core material. A pair of oppositely disposed cutting blades slit the insulation releasing it from its core by feeding it onto a driven take-up spool that pulls the insulation as it is slit away from the core material.

SUMMARY OF THE INVENTION

An insulation stripping device that adjustably engages wire and cable of varying degrees of the thickness against multiple cutting edged wheel in a two stage slitting process. The first stage removes a narrow uniform strip of insulation in tandem with the second stage that completes the process by a single oppositely disposed cut effectively releasing the insulation from the wire core.

DESCRIPTION OF THE DRAWINGS

FIG. 5 is an enlarged view of the first stage of the drive and cuttintg assemblies;

FIG. 6 is an enlarged view of the second stage of the drive and cutting assemblies; and FIG. 7 is an enlarged partial perspective view depicting a portion of a cable with its insulation cut for removal.

DESCRIPTION OF THE PREFERRED EMBODIMENT

Figure 1:
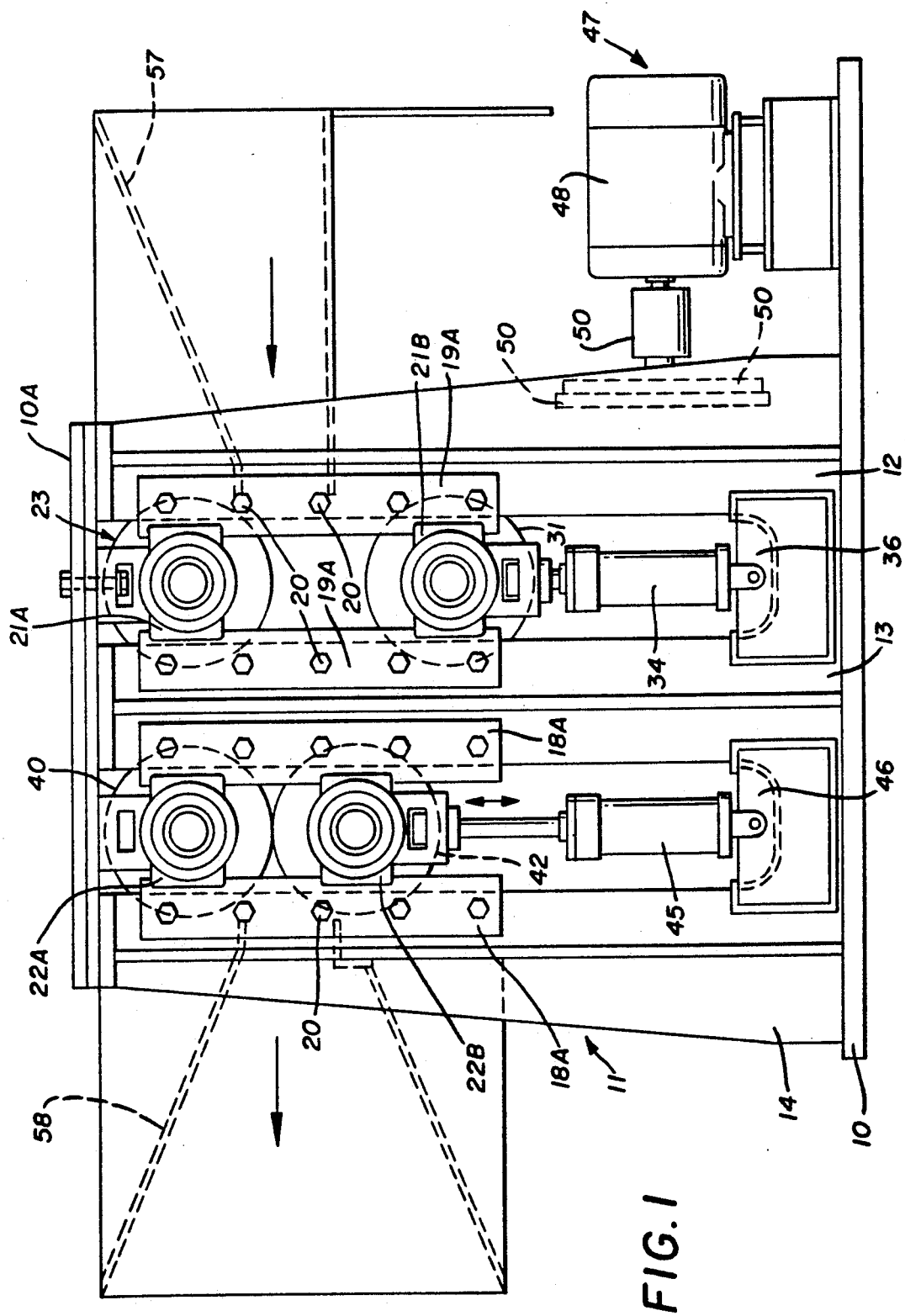
FIG. 1 is a plan view of the device with portions removed.
Figure 2:
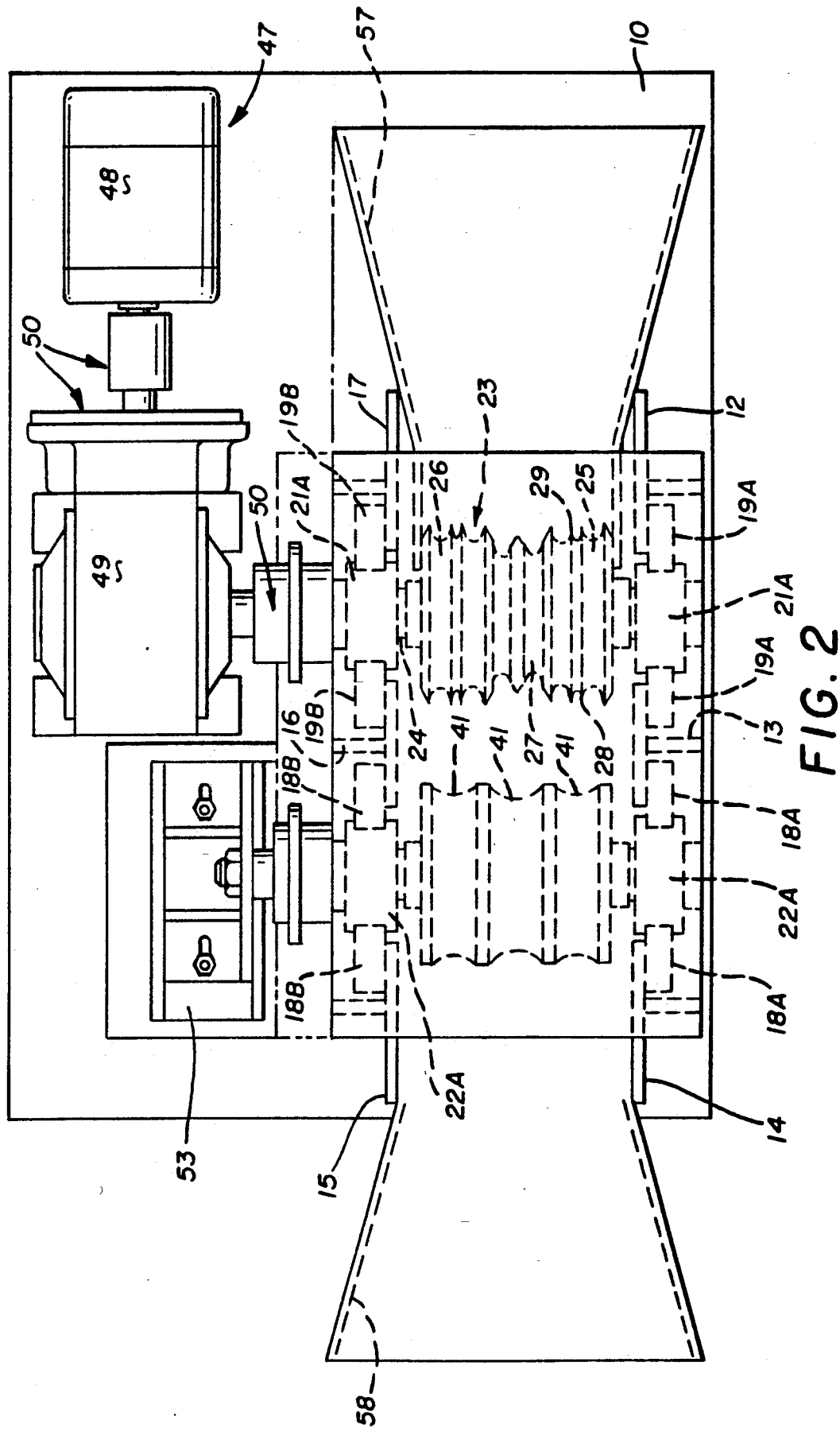
FIG. 2 is a top plan view of the device.

Referring to FIGS. 1 and 2 of the drawings an insulation stripping devcie for cables or the like can be seen having a base 10, an upstanding support frame 11 and an interconnected top plate 10A. The support frame 11 is comprised of multiple spaced vertically aligned standard elements 12-17. Selected groups of standard elements 12, 13, 14 and group 15, 16, 17 are indentical to each other and are positioned in spaced oppositely disposed relation to each other as best seen in FIG. 2 of the drawings. Bearing assembly support and guide brackets 18a and 18b and 19a and 19b are secured by multiple fasteners 20 in paired relationship to said selective standard element groups 12-14 and 15-17. Each pair of guide brackets 18A and 18B and 19A and 19B have pairs of oppositely disposed bearing assemblies 21A and 21B and 22A and 22B respectively. Said bearing assembly pairs 21A and 22B are fixed while said bearing assembly pairs 21A and 22B are movably positioned in said respective guide brackets 18A and B and 19A and B.

Figure 3:
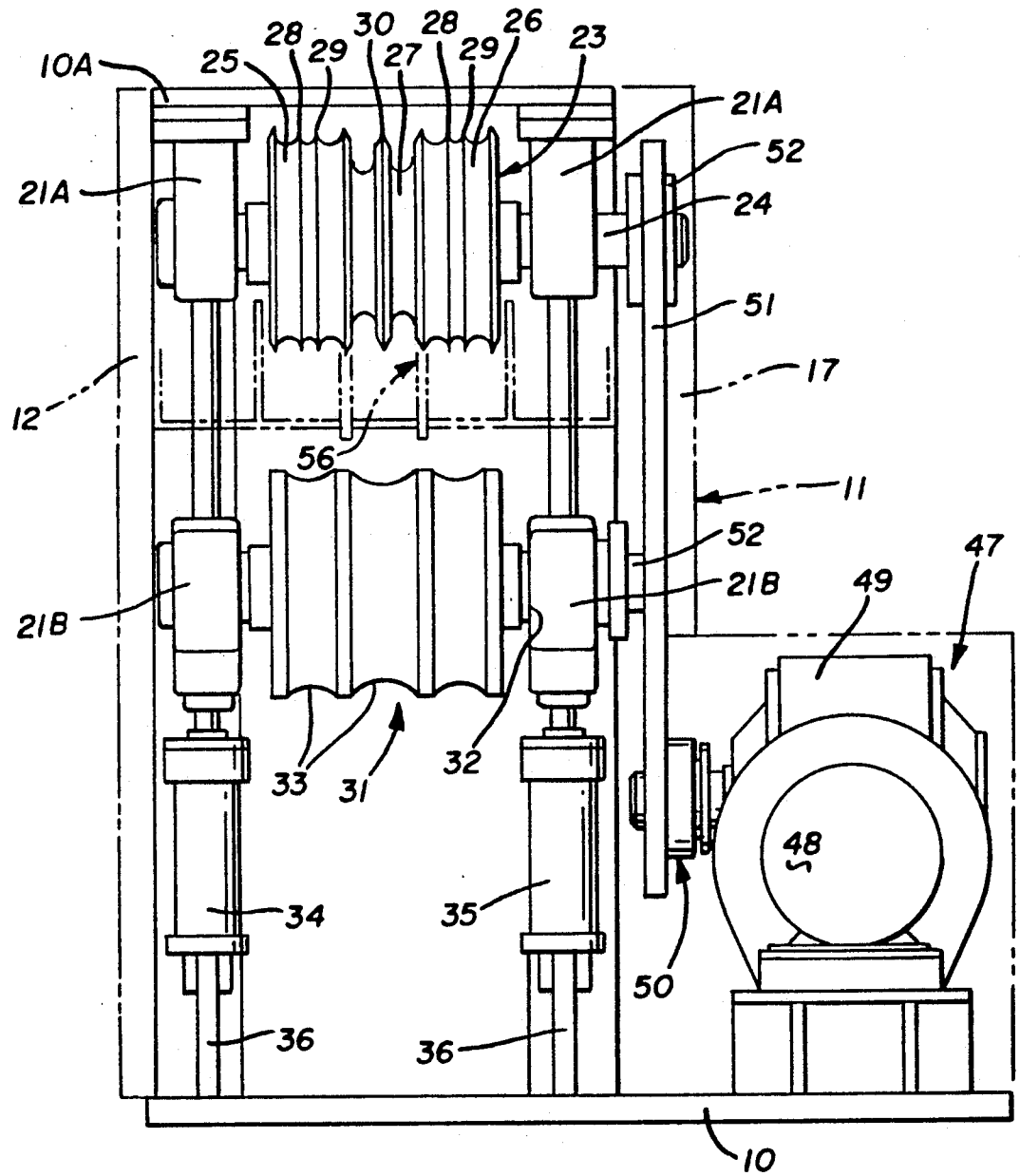
FIG. 3 is a side plan view on lines 3—3 of FIG. 1.

Referring now to FIGS. 2 and 3 of the drawings an infeed multiple wheeled cutting assembly 23 can be seen having a support shaft 24 and a plurality of cutting segments 25, 26, and 27 positioned thereon.

Each of said cutting segments 25 and 26 have two parallel spaced annular cutting edges 28 and 29 centrally located thereon. The cutting segments 27 has a single angular cutting edge 30. The support shaft 24 is positioned and held by the fixed bearing assemblies 21a as herein before described. An infeed drive roller assembly 31 having a roller support shaft and multiple concave drive surfaces 33 thereon. The roller support shaft 32 is positioned and held between said movable bearing assemblies 21b.

Piston and cylinder assemblies 34 and 35 extend from said respective bearing assemblies 21b to respective mounting members 36 upstanding from said base 10. It will be evident from the above description that upon activation of the piston and cylinder assemblies 34 and 35 that the interconnected infeed roller assembly 31 will move vertically along the representative guide bearing pairs 19A and 19B engaging said fixed cutting wheel assembly 23 as best seen in FIG. 5 of the drawings. Thus arranged the respective infeed assemblies 23 and 31 will define a cable enclosure path that will position and advance a concave cable 38 in this illustration with insulation 39 there between for multiple cuts through said insulation at 39A as will be discussed in greater detail below. Referring top FIGS. 1, 2, and 6 of the drawings an exit drive roller assmebly 40 can be seen positioned between said fixed bearing assmblies 22A. Said exit drive roller assembly 40 has multiple concave drive surfaces 41 the same as said drive surfaces 33 herein before described.

An exit wheel cutting assembly 42 can be seen in FIGS. 1 and 6 of the drawing positioned between said movable bearing assemblies 22b. The exit wheel cutting assembly 42 has three cutting areas 43 that align and correspond to the aforementioned drive surfaces 41 of the exit drive roller assembly 40. In this instance each of the cutting areas 43 has but a singular annular cutting edge 44 that will engage the cable insulation 39 at 39B as it passes there between. The exit wheeled cutting assembly 42 and said movable bearing assemblies 22B are secured to secondary piston and cylinder assemblies 45 extending from secondary respective upstanding mounting members 46 on the base 10.

Upon activation of said secondary piston and cylinder assemblies 45 the exit wheeled cutting assembly 45 advances vertically along its respective guide brackets 18A and 18B engaging the cable 38 against the here and before described exit drive roller assmebly 40.

Figure 4:
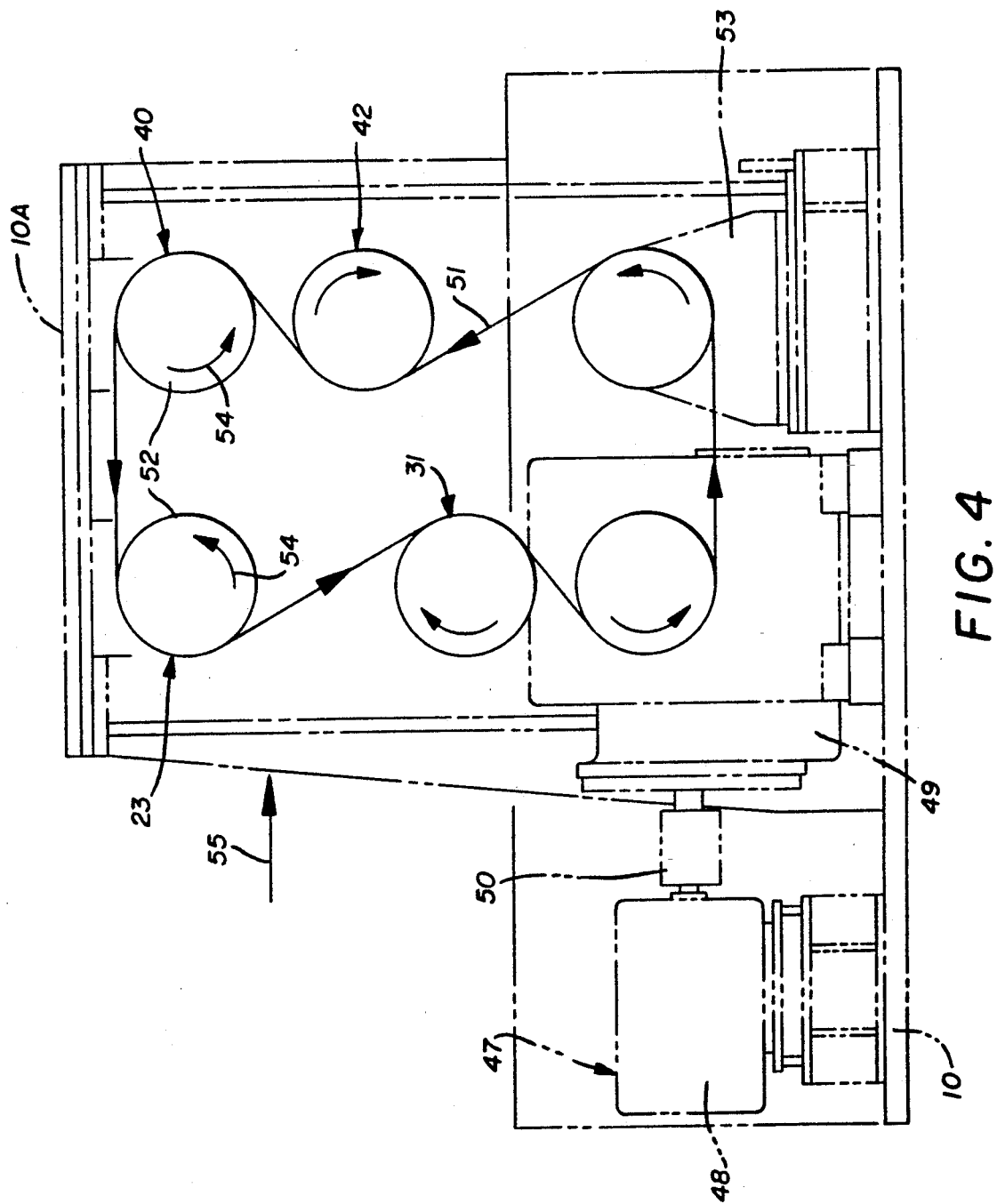
FIG. 4 is a side plan view of the device system with parts removed for illustration purposes.

Referring now to FIGS. 3, 4, and 6 of the drawings a drive assembly 47 can be seen having a motor 48 in communication with a reduction gearing transfer device 79 and associated interconnection bearings, couplings which are generally referred to as 50 and a control system not shown as it will be well known and understood by those skilled in the art.

A drive chain 51 is graphically illustrated in FIG. 4 of the drawings and is engagable over drive socket assemblies 52 on each of said support shafts 24 and 32 respective cutting and roller assemblies 23, 31, 40, and 42 respectively and a chain adjustment take up follower 53. The rotational direction of each of the drive and cutting assemblies as shown by representative arrows 54 which in tandem define the cable direction as indicated by the arrow 55 through the device.

Referring now to FIG. 3 of the drawings removable cable guide bar assembly 56 is shown in broken lines and can be seen positioned between said respective sets of entry and exit assemblies characterized by the pairing of the respective cutting and drive roller assembly pairs 23 and 31 and 40 and 42 respectively.

Inflow and exit guide hoppers 57 and 58 are positioned adjacent said respective exit and entry assemblies to insure proper alignment of the cable 39 entering and leaving the device.

In use the cable 39 enters the device via said guide hopper 57 and is first cut along its upper surface at spaced parallel points indicated by 39A and B by engagement of the cutting and drive assemblies 23 and 31. The cable 39 thus cut is then engaged between the respective exit cutting wheel and exit drive assemblies 42 and 40 and is cut along its oppositely disposed lower elongated surface at 39B exiting through the exit hopper 58 in a stripped condition.

It will be evident from the above description that as the cable is cut in parallel lines at 39A on its upper surface a signal strip 59 is removed from the cable insulation 39.

The removal of the strip of insulation 59 is critical to the success of this device since the major problem in stripping cable or wire is the removal of the insulation once the cut has been made. By removal of the strip 59 the insulation 39 has adequate expansion space so as it is engaged between the exit cutting and drive roller assemblies 42 and 40 and cut at 39 along its oppositely disposed surface the insulation will be cleanly and easily separated from a cable core 60 as it exits the device.

It will thus be seen that a new and useful high speed cable and wire stripper has been illustrated and described and that various changes and modifications may be made therein without departing from the spirit of the invention, therefore

I claim:

1. A device for high speed cable and wire stgripping of associated insulation and convering comprising, infeed multiple wheeled cutting assembly and an infeed drive roller assembly and an a exit wheel cutting assembly and a exit drive roller assembly, said infeed multiple wheeled cutting assembly comprises multiple cutting segments, some of said segments have spaced parallel cutting edges within, said infeed drive roller assembly comprising multiple drive surfaces aligned with said infeed cutting segments, means for advancing said infeed drive roller assembly for cable engagement with said infeed multiple wheeled cutting assembly, said exit wheel cutting assembly comprising multiple cutting segments each of which has a signal annular cutting edge within, said exit drive roller assembly comprising multiple drive surfaces aligned with said multiple cutting segments, means for advancing said exit wheel cutting assembly against said exit drive assembly, means for driving said respective infeed and exit wheeled cutting and said infeed and exit drive assemblies.

2. The cable and wire stripping device of claim 1 wherein said infeed multiple wheeled cutting assembly is rotatably secured within a support frame, said infeed drive roller assembly is movably secured within said support frame in oppositely disposed relation to said multiple wheeled cutting assembly.

3. The cable and wire stripping device of claim 2 wherein said support frame has a base, a top, infeed and exit guide hoppers.

4. The cable and wire stripping device of claim 1 wherein said means for advancing said infeed drive roller assembly comprises a piston and cylinder assembly interconnected with said infeed drive roller assembly and guide brackets.

5. The cable and wire stripping device of claim 1 wherein said means for advancing said exit wheeled cutting assembly comprises piston and cylinder assemblies interconnected thereto and associated guide brackets.

6. The cable and wire stripping device of claim 1 wherein said means for driving said infeed and exit wheel cutting and respective drive assemblies comprises a drive assembly having a motor, associated gear transfer device, an endless chain, and engaging drive socket assemblies on each of said infeed and exit wheeled cutting and respective drive assemblies.

7. The cable and wire stripping device of claim 6 wherein said drive assembly has a source of power and associated control means.

* * * * *